(12) United States Patent  
Khan et al.

(10) Patent No.: US 11,331,578 B2  
(45) Date of Patent: May 17, 2022

(54) GAME PLATFORM

(71) Applicant: Cerberus Interactive, Inc., Cedar Park, TX (US)

(72) Inventors: Tawsif Khan, Austin, TX (US); Beau Button, Cedar Park, TX (US); Timothy Mahler, Austin, TX (US)

(73) Assignee: CERBERUS INTERACTIVE, INC., Austin, TX (US)

(*) Notice: Subject to any disclaimer, the term of this patent is extended or adjusted under 35 U.S.C. 154(b) by 0 days.

(21) Appl. No.: 17/037,647

(22) Filed: Sep. 29, 2020

(65) Prior Publication Data

US 2021/0106916 A1  Apr. 15, 2021

Related U.S. Application Data

(63) Continuation of application No. 17/024,587, filed on Sep. 17, 2020.

(60) Provisional application No. 62/914,819, filed on Oct. 14, 2019.

(51) Int. Cl.
```
A63F 13/65      (2014.01)
A63F 13/216     (2014.01)
A63F 13/61      (2014.01)
```
(52) U.S. Cl.
CPC ............ *A63F 13/65* (2014.09); *A63F 13/216* (2014.09); *A63F 13/61* (2014.09)

(58) Field of Classification Search
CPC .............................. A63F 13/65; A63F 13/216
See application file for complete search history.

(56) References Cited

U.S. PATENT DOCUMENTS 9,669,296 B1   6/2017  Hibbert et al.  
10,354,176 B1*  7/2019  Apt ................... G06K 19/06112  
(Continued)

FOREIGN PATENT DOCUMENTS

| | | | |
|---|---|---|---|
| KR | 10-2002-0028238 A | 4/2002 |
| KR | 10-2014-0015790 A | 2/2014 |
| KR | 10-2014-0036497 A | 3/2014 |

OTHER PUBLICATIONS

International Search Report issued in International Application No. PCT/US2020/051318, dated Dec. 23, 2020 (Dec. 23, 2020). 3 pages.

(Continued)

*Primary Examiner* — Robert P Bullington, Esq.  
*Assistant Examiner* — Carl V Larsen  
(74) *Attorney, Agent, or Firm* — Mintz Levin Cohn Ferris Glovsky & Popeo, P.C.; F. Jason Far-hadian, Esq.

(57) ABSTRACT

Methods and systems for hosting a virtual environment in which geographic coordinates of a user are mapped to virtualized coordinates of an avatar in the virtual environment. The user's geographic coordinates may be compared to real world geographic coordinates of one or more entities having a presence in the virtual environment. The user may be presented with options for accepting or activating a first reward from the list of rewards. Responsive to the user selecting the first reward, the first reward may be activated for a first time period in association with one or more goods or services offered by the first entity. The user may be rewarded in response to verifying the user has purchased the offered goods or services during the first time period.

19 Claims, 11 Drawing Sheets

(56) References Cited

U.S. PATENT DOCUMENTS

| | | | |
|---|---|---|---|
| 2007/0174166 A1* | 7/2007 | Jones | G06Q 30/02 |
| | | | 705/35 |
| 2009/0005140 A1* | 1/2009 | Rose | A63F 13/12 |
| | | | 463/7 |
| 2012/0040743 A1* | 2/2012 | Auterio | A63F 13/216 |
| | | | 463/25 |
| 2013/0246148 A1* | 9/2013 | Ross | G06Q 30/0224 |
| | | | 705/14.25 |
| 2013/0256403 A1* | 10/2013 | MacKinnon Keith | |
| | | | G06Q 20/42 |
| | | | 235/375 |
| 2014/0058813 A1* | 2/2014 | Levi | G06Q 30/0251 |
| | | | 705/14.12 |
| 2015/0032561 A1 | 1/2015 | Yu et al. | |
| 2015/0281950 A1* | 10/2015 | Carr | H04W 12/08 |
| | | | 455/411 |
| 2017/0293926 A1* | 10/2017 | Clark | G06Q 20/381 |
| 2019/0080342 A1* | 3/2019 | Andon | A63F 13/212 |

OTHER PUBLICATIONS

Written Opinion issued in International Application No. PCT/US2020/051318, dated Dec. 23, 2020 (Dec. 23, 2020). 6 pages.

* cited by examiner

FIG. 9

GAME PLATFORM

CROSS-REFERENCE TO RELATED APPLICATIONS

The present application claims priority to and the benefit of the earlier filing date of U.S. Provisional Application Ser. No. 62/914,819, filed on Oct. 14, 2019, the content of which is hereby incorporated herein by reference in entirety. The present application further claims priority to and is a continuation of U.S. application Ser. No. 17/024,587, filed on Sep. 17, 2020, the content of which is also hereby incorporated herein by reference in entirety.

TECHNICAL FIELD

The disclosed subject matter generally relates to providing a video game platform in which players are incentivized to purchase merchandise or services from certain merchants or service providers. More particularly, the players may be incentivized by options for receiving one or more prizes or rewards, in exchange for visiting in-game virtual locations or real world merchant locations to purchase certain goods or services within a predetermined timeline.

BACKGROUND

Mobile-based video game platforms can be implemented in augmented reality, virtual reality or mixed reality environments. Some of these game platforms provide a way for a player to interact with both virtual and real environments. With increased connectivity, speed and access to the Internet, many players from all over the world can interact between these environments and compete in various in-game quests.

Location-based augmented reality mobile games typically have a virtual world geography that parallels the real world environment. Such games are generally focused on transitioning to specific locations such as landmarks, monuments, or other points of interest in the real world to complete virtual objectives. Most of these games do not offer any real world engagement other than going to the specific real world destinations to collect valuable digital goods, game offerings, or quest items.

Currently, there are no gaming platforms that are configured for digitally rewarding a player for buying real world goods or services from the real world vendor locations. Thus, even if a vendor at a real world location is achieving a lot of traffic from players in a location-based augmented reality game, there is no way to track or verify if the real world goods or services are purchased by a particular player at a particular location.

It would be advantageous if a real time virtual-to-real world exchange platform could incentivize players to visit real identifiable locations or virtual locations or sites where the players can collect different in game items or prizes, in exchange for a player purchasing real world services or goods from real world brick and mortar merchants or service providers.

SUMMARY

For purposes of summarizing, certain aspects, advantages, and novel features have been described herein. It is to be understood that not all such advantages may be achieved in accordance with any one particular embodiment. Thus, the disclosed subject matter may be embodied or carried out in a manner that achieves or optimizes one advantage or group of advantages without achieving all advantages as may be taught or suggested herein.

In accordance with some implementations of the disclosed subject matter, computer-implemented methods and systems are provided for hosting a location-based reality game on a game platform. The game platform may be utilized for associating a player playing the location-based reality game with a source of funds and determining geographic coordinates of the player in real world surroundings. The location-based reality game may include an in-game geography that parallels at least a portion of the geographic coordinates of the player in the real world. The player's relative position coordinates may be monitored based on information stored in a database. The database may include information about a list of real world merchant locations, merchant offers or merchant reward tiers.

In some embodiments, a list of rewards associated with at least one of the merchant offers, merchant locations and merchant reward tiers may be determined based on the player interacting with a game interface or offer. An in-game reward may be presented to the player. The game platform may receive and process payment transaction data associated with a purchased real world merchant offer associated with the player. The real world merchant offer may be matched with an in-game reward reservation based on payment transaction data comprised of at least one of a purchase timestamp and a merchant id.

In accordance with one or more aspects, computer-implemented methods and systems are provided for hosting a location-based virtual environment in which the one or more users may participate. Geographic coordinates of a user may be determined in the real world, using data provided by a positioning system. The real world geographic coordinates of the user may be mapped to virtualized coordinates of an avatar in the virtual environment. The user's real world geographic coordinates may be compared to real world geographic coordinates of one or more entities having a presence in the virtual environment. The user may be presented with options for accepting or activating a first reward from the list of rewards. Responsive to the user selecting the first reward, the first reward may be activated for a first time period in association with one or more goods or services offered by the first entity. The user may be rewarded in response to verifying the user has purchased the offered goods or services during the first time period.

In certain embodiments, a computer-implemented system comprising one or more processors in communication with storage media for storing location data for one or more users is provided. The system may host a location-based virtual environment in which the one or more users participate and determine geographic coordinates of the user in the real world using data provided by a positioning system. The user's real world geographic coordinates may be compared to real world geographic coordinates of one or more entities having a presence in the virtual environment. The one or more entities being present in the virtual environment to promote goods or services by way of one or more offers presented in the virtual environment. A list of rewards associated with at least one of the offers may be accessed based on the comparison. The user may be presented with options for accepting or activating at least a first reward from the list of rewards, the first reward being associated with purchasing goods and services from a first entity. Responsive to the user selecting the first reward, the first reward may be activated for a first time period in association with one or more goods or services offered by the first entity.

In one aspect, payment transaction data from a transaction processing entity may be received, in response to the user purchasing at least one of the one or more goods or services offered by the first entity. The payment transaction data may comprise at least one of a timestamp and an identifier, the timestamp indicating a time of purchase and the identifier identifying the first entity or an offer by the first entity that was activated by the user. The user may be notified that the user has been awarded the first reward, in response to verifying the user has purchased the offered goods or services associated with the first reward during the first time period based on the payment transaction data.

In some embodiments, the virtual environment is a location-based reality game. Information about the entities' real world coordinates or goods or services offered by the entities or the associated rewards may be stored in a database accessible by the one or more processors. The source of funds may be associated with a user identifier identifying the user when the user purchases at least one of the one or more goods or services using the source of funds. The transaction data may comprise the user identifier.

Depending on implementation, the user may not be awarded the first reward, in response to the system failing to verify that the user purchased the offered goods or services associated with the first reward during the first time period, or due to insufficient funds, or due to an invalid source of funds. Further, the user may be unable to accept or activate the first reward, in response to the system's inability to verify that the user is associated with a source of funds.

In some aspects, the user may be offered to apply for a new source of funds or enter information about a pre-established source of funds. In response to being approved for the new source of funds or verification of the pre-established source of funds, a unique identifier may be associated with the user, allowing the system to activate a selected reward for the user based on the unique identifier being associated with the user and an established source of funds.

The details of one or more variations of the subject matter described herein are set forth in the accompanying drawings and the description below. Other features and advantages of the subject matter described herein will be apparent from the description and drawings, and from the claims. The disclosed subject matter is not, however, limited to any particular embodiment disclosed.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations as provided below.

FIGS. 5, 6, 7, 8 and 9 illustrate example screenshots of various graphical user interfaces for reporting, controlling, processing or activating certain game features, in accordance with one or more embodiments.

The figures may not be to scale in absolute or comparative terms and are intended to be exemplary. The relative placement of features and elements may have been modified for the purpose of illustrative clarity. Where practical, the same or similar reference numbers denote the same or similar or equivalent structures, features, aspects, or elements, in accordance with one or more embodiments.

DETAILED DESCRIPTION OF EXAMPLE IMPLEMENTATIONS

In the following, numerous specific details are set forth to provide a thorough description of various embodiments. Certain embodiments may be practiced without these specific details or with some variations in detail. In some instances, certain features are described in less detail so as not to obscure other aspects. The level of detail associated with each of the elements or features should not be construed to qualify the novelty or importance of one feature over the others.

Figure 1:
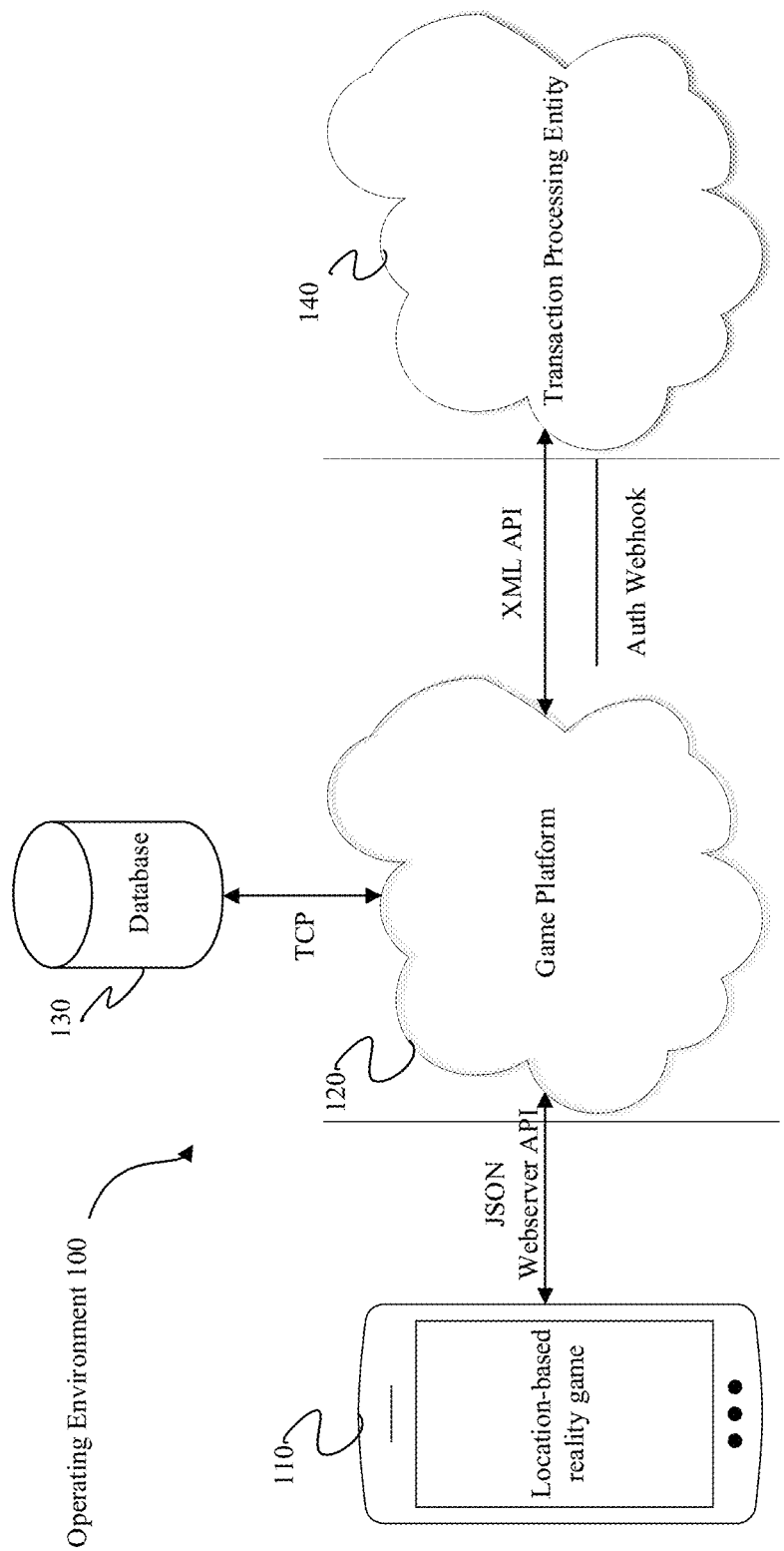
FIG. 1 illustrates an example operating environment in accordance with one or more embodiments, wherein a game platform is provided for a location-based reality game.

Referring to FIG. 1, an example operating environment 100 is illustrated in which a location-based reality game may be used by a player to interact with a virtual world having a geography that parallels the real world. The location-based reality game may execute on one or more game computing systems 110 such as a general purpose computer, a handheld mobile device (e.g., a smart phone), a tablet (e.g., an Apple iPad®), a game console, a portable game device, a wearable computing device, or other communication capable computing device. The location-based reality game may be configured to operate through a web browser, as a dedicated app or other type of software application running either fully or partially on a game computing system 110.

In one example, the game computing system 110 may communicate over a communications network with a game platform 120 to access data stored in a database 130. The game computing system 110 may also access services provided by a transaction processing entity 140. Depending on implementation, database 130 may be positioned local to, remote to, or embedded in one or more of game computing system 110 or other systems on which the location based reality game or transaction processing entity 140 execute on. A server system may be configured on the game platform 120 or transaction processing entity 140, or both, to service one or more requests submitted by the game computing system 110 (e.g., client system) via the game platform 120. The game platform 120 may be implemented over a local or wide area network (e.g., the Internet).

Depending on implementation, the location-based reality game and game platform 120 may be implemented over a centralized or distributed (e.g., cloud-based) computing environment as dedicated resources or may be configured as virtual machines that define shared processing or storage resources. Execution, implementation or instantiation of location-based reality game or the associated in-game objects, as well as the game platform 120, and the related features and components, may be over a server system that defines a special purpose machine that provides remotely situated client systems, such as the computing system 110, with access to a variety of data and services as provided in further detail below.

Figure 2:
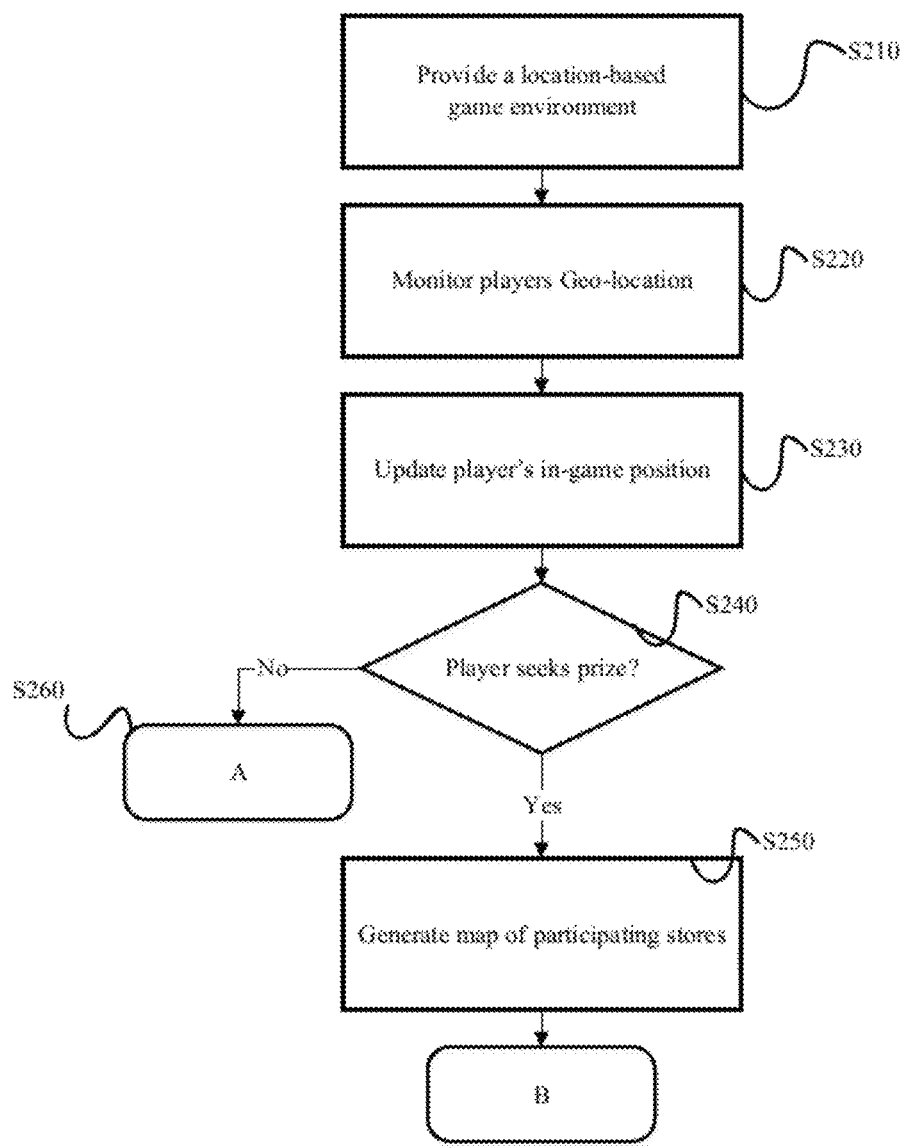
FIG. 2 is an example flow diagram of a method of providing players with digital in game reward options for a location-based game, in accordance with some embodiments.

Referring to FIGS. 1 and 2, example methods for providing a game platform in which players are incentivized to visit select geographic locations are disclosed. A location-based game environment may be provided in which a virtual space within the game is mapped to the geolocation of the player on earth (S210). When the player is physically present in a certain geographic location, the virtual space in the game corresponds to the player's physical location on earth, hereafter referred to as the player's geo-space or geo-location. The player geo-location may be monitored (S220). In response, the games graphical user interface or the in-game position of the player's avatar in the game may be updated in real-time (or near real-time) as the player moves in the geo-space (S230).

In accordance with one or more implementations, a player may be incentivized to visit merchant locations in the geo-space (i.e., real-world brick and mortar merchant locations), as identified in the game, in order to collect valuable game prizes or features (e.g., digital goods, game offering, etc.) in the game's virtual environment. For example, when a player seeks to collect a prize (S240), the player's geo-location may be used to generate a map that shows the position of one or more participating merchant stores at which the player may collect one or more prizes (S250). Otherwise, the game may continue (S260).

Figure 3:
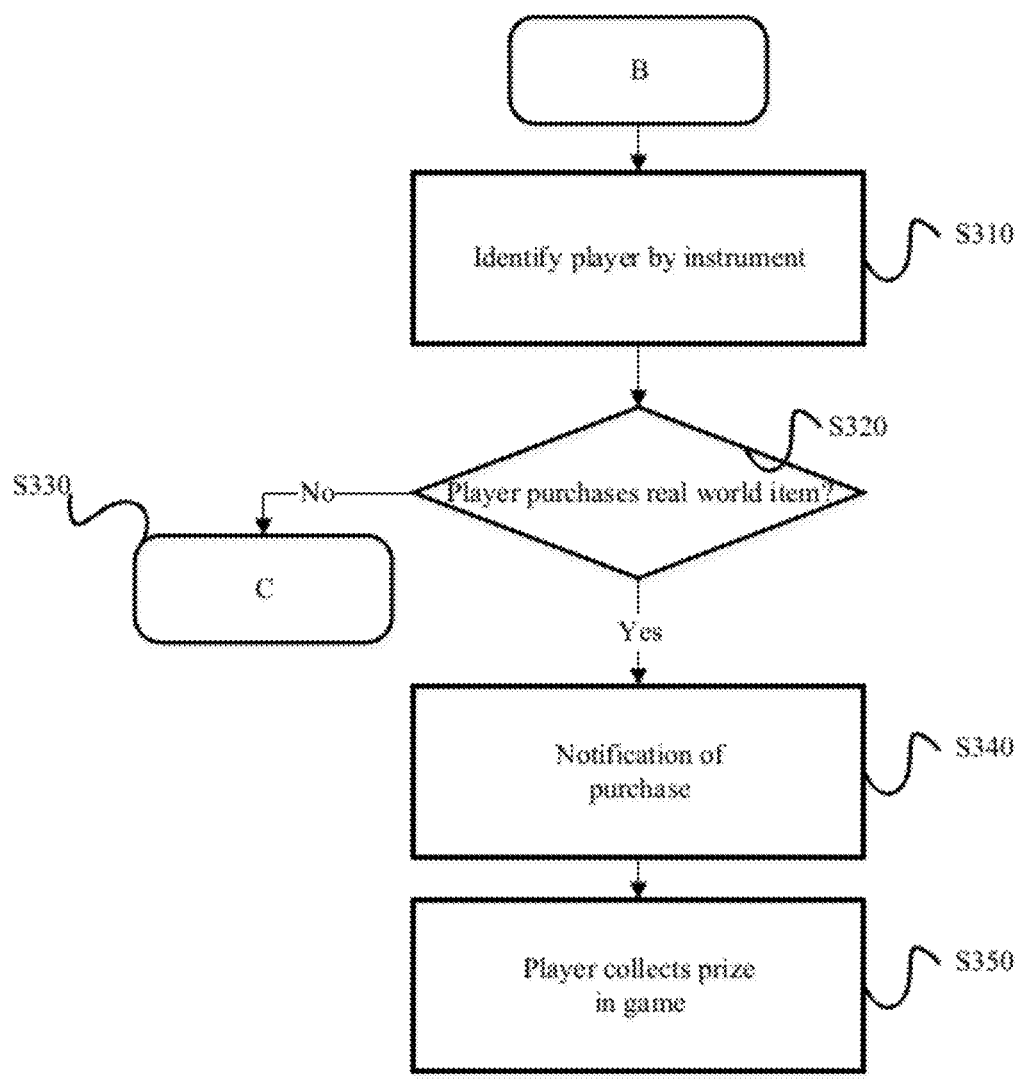
FIG. 3 is an example flow diagram of a method of providing a digital in game reward in exchange for a real world item for a location-based game, in accordance with one or more embodiments.

Referring to FIG. 3, in certain aspects, to collect a prize, a player may select a location on the map that is provided in the game environment and use that map to move in the real world toward the selected location. Once the player reaches the intended destination on the map (e.g., a coffee shop), the player may decide to purchase one or more identified real world objects (e.g., a cup of coffee) from the real world store or merchant at the destination as designated by an in-game menu, for example. As provided in further detail below, the player may collect the prize in the game environment in exchange for making a designated purchase from the merchant, provided that the player can be identified.

Depending on implementation, and without limitation, in order to identify the player, the player may use an instrument that identifies the player (S310). The identification process is preferably performed at the time of purchase, or may be performed at some time prior or after the time of purchase (e.g., a pre- or post-purchase registration process through a portal or social media account). The identifying instrument may be a digitized instrument such as a magnetic or chip-enabled card, a digital token, or other type of instrument that can electronically or digitally identify the player. In an example embodiment, the identifying instrument may be associated with a source of funds (e.g., a credit card, a debit card, a money pool, a points pool, crypto currency, or other type of account) which may be registered by the player and used to pay for the item purchased from the merchant (S320).

If the player does not wish to be identified, or if the player uses an unregistered source of funds, or decides not to purchase an identified item (e.g., an item suggested in the game environment), then the player may not be able to collect the prize associated with the suggested sale item (S330). The player may be identified by, for example, using a registered source of funds. The identification may be performed, for example, when the transaction for the purchase of the item is successfully completed (e.g., by way of swiping a credit card). Once the purchase is completed, a notification of the purchase may be submitted to the game platform 120 by the transaction processing entity 140 (S340).

In one or more aspects, the notification of purchase may include identifying information associated with the player and the location of sale and the merchant's data, as provided in further detail herein. Based on the information collected and the notification of purchase, the player is able to collect the prize in the game environment (S350). In one example embodiment, the player may receive a notification after purchasing an item from the merchant store that a prize is available for collection, or the notification may indicate that the corresponding in-game prize has been delivered or added to the player's in-game profile, or account, or that the prize is available to be redeemed by the player next time the player starts a game session.

The game infrastructure (e.g., game platform 120), depending on implementation, may be able to determine that a real world purchase was successfully completed based on the identifying information collected about the player at the time of the real world transaction. The identifying information may be available through processing systems, entities or networks (e.g., transaction processing entity 140) that validate and clear the real world transaction associated with the purchase of a target item from a target merchant. The processing entity 140 may collect and provide, in addition to the player's location and purchase information, data about the store at which the item was purchased and other information that may be deduced from the collected information.

The following provides an example scenario in which a player collects a prize (e.g., a digital coin) in a game environment such as operating environment 100 of FIG. 1. In the virtual space defined by the game, the prize may be located at a merchant location, such as a coffee shop or fast food vendor with an associated physical location in the player's geo-space. Before or at the time when the player arrives at the merchant's location in the geo-space, the game environment may display information to the player indicating what items are available for purchase from the merchant's location by correlating the geo-location of the player to an in-game presentation of the merchant.

In some aspects, additional information that suggest what prizes will be unlocked or collected, in the game, may be also displayed before, during or after one or more selectable items are purchased from the merchant at the identified geo-location. It is noteworthy that in certain embodiments, the player need not necessarily physically visit a merchant's geo-location in the real world to complete the purchase or activate an offer for an in-game prize. In some aspects, the player may decide to complete an on-line purchase of goods or services by going to a webpage or through an app, and elect to receive delivery of a real-life good or service at a later time. For example, the player may order coffee from Starbucks® and choose Uber Eats™ as a delivery option to the player's current geo-location, or may purchase or rent a movie for future viewing in order to activate or unlock an in-game offer or incentive.

The player may, in certain embodiments, select one or more of the items (e.g., from an in-game menu) to purchase offered goods and services. The player may offer a credit card, for example, to pay the merchant for the selected items. The player's source of funds (e.g., a credit card, debit card, money pool, points pool or other type of account) may be processed by a transaction processing entity 140 (e.g., Visa®). Once the purchase is successfully completed, a notification is provided to the game platform 120 (e.g., game studio or game vendor) confirming the purchase. Based on the purchase confirmation, the particular in-game prize or prizes associated with the real world goods or services purchased may be redeemed by the player or may be digitally delivered or conveyed to the player in the game environment, either at the time of purchase or sometime thereafter (e.g., by way of delivering the prize notification to the player inbox).

Player and merchant-related information may be collected during a transaction by game platform 120 (or a proxy entity), either directly or indirectly, and may be used to build a profile for the player or the merchant, or both. Based on the player or merchant profile, future offers may be delivered to the player or advertising programs may be offered to the merchant. For example, the player may receive, either in the game or in the real world, offers to visit the same or similar merchant locations in the future, depending on the type of information that have been collected from, or made available by, the player at the time, after or prior to the transaction.

The merchants may also receive information about transaction timelines and player demographics who purchased the items. In certain embodiments, the merchant may also receive additional valuable consumer profile data, which may or may not be anonymized by game platform 120, depending on player permission settings, opt-out options and privacy laws. Advantageously, using the above process, a vendor or merchant is not required to develop or incorporate any application programming interfaces or computing infrastructure into the merchant's transaction processing system. The merchant simply processes the player's credit card or other source of funds in the normal course of business without having the overhead associated with reserving or activating additional computing resources, whether in form of processing or storage resources.

In some embodiments, as long as a player links or registers the source of funds (e.g., a credit card number) with an in-game service provider (i.e., one or more processing entities that manage the game-related transactions), the player will be appropriately identified (e.g., based on the credit card number or other identifying data) and will be able to collect the associated prizes in the game. The merchant may have an arrangement with the in-game service provider to incorporate one or more merchant stores or geo-locations into one or more games managed by the in-game service provider. The incorporation of the merchant stores or items offered at a merchant store may be in form of any graphical user interface (e.g., in-game objects, banners, etc.).

As an example, a coffee shop merchant may have 100 locations in a particular geo-space (e.g., Seattle). The merchant may enter into an arrangement with the in-game service provider to incorporate, for example, 26 of the coffee shop's geo-locations into a first game, and 24 of the coffee shop's geo-locations into a second game. The in-game service provider may be able to, depending on the merchant's objectives, use different prizes for different purchase items or geo-locations. For example, an in-game service provider may offer a highly desirable in-game prize, if a player purchases a first item on the menu from a merchant store in a first geo-location. The in-game service provider may offer a less desirable in-game prize, if a player purchases a second item on the menu from a merchant store in a second geo-location. In this manner, the merchant may be able to pay a higher fee to incentivize purchases in merchant stores at geo-locations that do not have sufficient traffic (e.g., a new store) by way of the in-game service provider offering more valuable in-game prizes at the stores with lower traffic.

Depending on statistics and demographic information associated with a prize or a game, the merchant may be able to direct traffic to selected geo-locations of players that fit a certain category or consumer profile. For example, a first game may be known to be popular among players in a first group (e.g., 25 to 30 year-old females) and a second game may be known to be popular among players in a second group (e.g., 12 to 18 year-old males). Merchants can identify the demographics they want to target and the game platform can decide or push the merchants' offers in some games over others accordingly. For example, the merchant or the game platform may decide to provide in-game prizes in the first game in association with a first merchant store that sells goods or services appropriate for players that fit the first group (e.g., women clothing or jewelry), and provide in-game prizes in the second game in association with a second merchant store that sells goods or services appropriate for players that fit the second group (e.g., young men shoes or sporting goods).

As provided in further detail herein, in some implementations, offers provided to a player may be time locked. That is, offers available at one or more merchant locations may be available only during certain windows of time. For example, an offer may be available for redemption from 2 pm to 6 pm, or for 10 days or 30 days from activation or acceptance of an in-game offer by the player. According to some variations, a player may be required to spend a certain amount (e.g., at least $10) or purchase a certain number of products from one or more identified merchants during the designated time in order for an offered incentive or reward to be awarded to the player. In some embodiments, the player may be required to spend a cumulative amount over a defined period of time. For example, the player may be required to spend $100 at one or more identified merchant locations during a period of one month in order to receive or unlock one or more in-game prizes.

According to the methodologies provided herein and the various embodiments disclosed, a participating merchant may thus benefit from increased revenue by attracting players with desirable profiles, backgrounds or interests to select merchant stores. Merchant participation may be based on a subscription fee arrangement or an ongoing royalty revenue generation scheme. A participating transaction processing entity 140 (e.g., Visa) may also benefit from charging a transaction fee for processing the related transactions and providing the identifying information about the player and the merchants to the in-game service provider. The in-game service provider may generate revenue based on an arrangement made with the merchants and may share some of the generated revenue with the content provider (e.g., the entity that develops or provides the game environment).

Figure 4A:
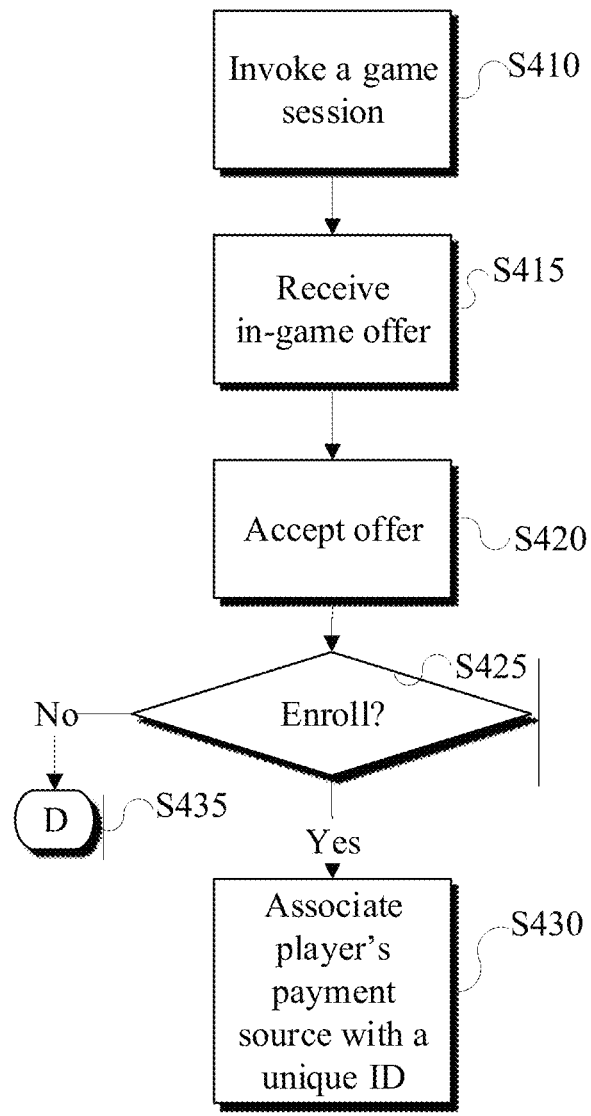
FIGS. 4A and 4B provide block and flow diagrams of example computing environments and methods that may be utilized to perform one or more computing operations or processes as consistent with one or more disclosed features related to player enrollment, purchase flow, offer activation and reward processing.
Figure 4B:
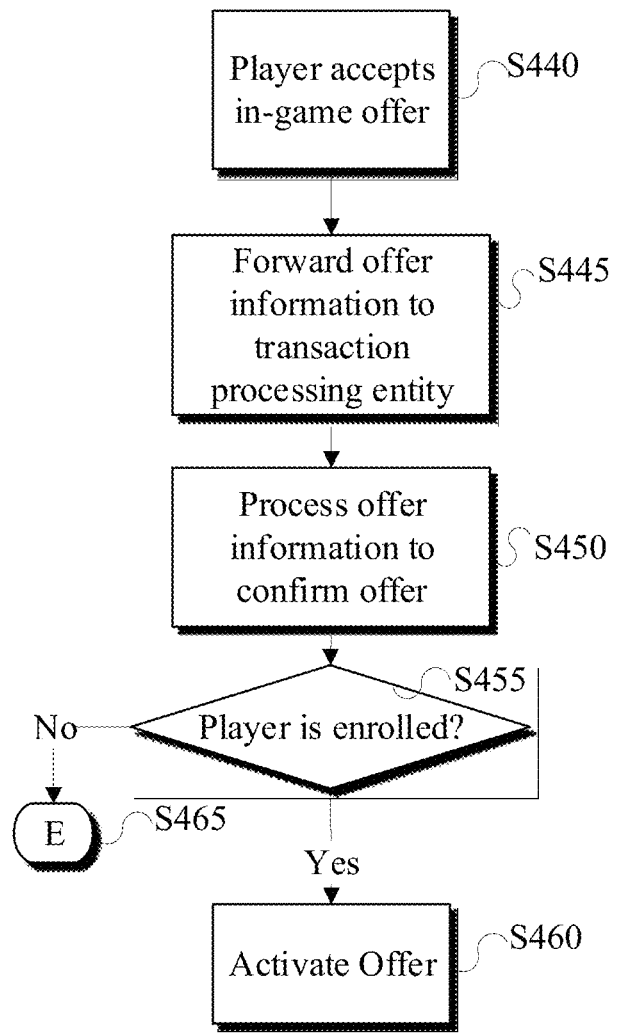

Referring to FIGS. 1 and 4A, a player may interact with a user device (e.g., game computing system 110) to invoke a game session for a game supported on the game platform 120 (S410). During the game, the player may receive an in-game offer or incentive for purchasing merchandise or services (S415). This offer may be associated or promoted in association with a service provider or merchant that has entered into an agreement with the game platform 120 to advertise within the game environment. The game platform 120 may control or have an arrangement with an entity (e.g., a proxy) that controls, for example, the database 130 and one or more game servers (not shown) to implement and tool one or more games or gaming platforms for the purpose of providing in-game incentives and offers to all or select players.

In one embodiment, the player interacts with a user interface (e.g., see FIGS. 5 through 7) to activate or accept an in-game offer or incentive (S420). The offer may be for the player to accept a mission within the game, for an identified period of time, for example, during which the provided incentive in the game is active. The incentive may be for the player to purchase a real-world item from a merchant at a regular or a discounted rate. Upon verification of the purchase, the player will receive (or may become eligible to receive) an in-game reward.

Depending on implementation, the reward may include game currency, free elevation to a higher game level, free loot, extra energy or stamina, upgraded weapon, exclusive mini-games, opportunity at winning additional or better prizes, or other types of rewards or incentives that may encourage a player to purchase an item or subscribe to a service outside the game environment. In certain embodiments, the player will continue to receive the in-game reward for the duration that the incentive is active.

In order to receive the incentive, the player may be associated with a unique identifier (ID) provided and assigned to the player by the game platform 120. To obtain the ID, the player may be offered to enroll with a financial institution or a transaction processing entity 140 (S425). If the player decides to enroll, transaction processing entity 140 may provide the player with the option to input information about a payment source, such as a credit card, debit card, a bank account or other payment mechanism.

In certain aspects, the player may apply for a new credit card. Alternatively, if the player already has a credit card number, the player may interact with the game platform 120 to enter the credit card number preferably directly to the transaction processing entity 140. The payment source information is then associated with a unique ID for the particular player (S430). If the player cannot register for a new payment source or otherwise provide a payment source, the player may be denied enrollment (S435).

The transaction processing entity 140, upon completion of the enrollment process, may tokenize the credit card number (e.g., using a hash or randomizer mechanism) to generate a token that represents the player's credit card number or other source of funds. The token may be also encrypted so that, if intercepted by an unscrupulous party, the player's sensitive credit card information cannot be easily revealed or stolen.

In certain aspects, the token or a token ID associated with the token (desirably in addition to a user ID associated with the player) may be packetized and communicated from the transaction processing entity 140 to the game platform 120. This tokenization process limits both the game platform 120's access and its liabilities associated with maintaining or storing the player's sensitive data under certain regulations. The game platform 120 may store the token and user ID in a database 130 to identify the player and player-related transactions within the game.

Once the player has successfully applied for enrollment or has been enrolled in the game platform's 120 incentivization program, the player may be provided with an interface within or outside the game environment to make a purchase. Notably, the purchase may be for an item or a service either at a physical store or alternatively on-line via a virtual store, app, webpage or within the game environment. As provided in further detail herein, the player may be required to activate an offer and purchase the offered products or services with a fund source that is enrolled in the incentive program, desirably within an active or eligible time period, for the player to receive the offered in-game reward.

Figure 5:
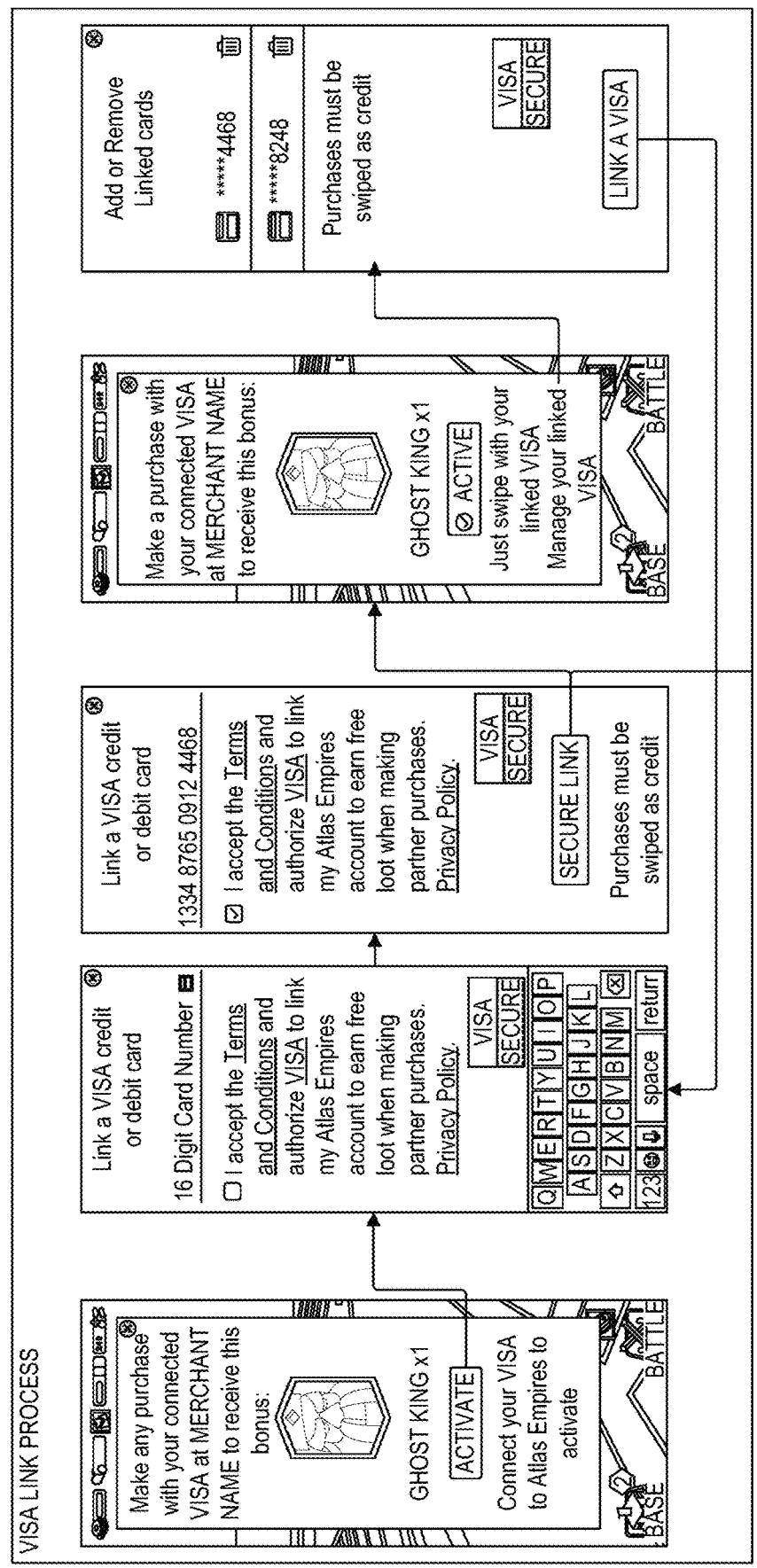

Referring to FIGS. 4B and 5 through 9, to activate an offer for a player, the game platform 120 determines whether the player has accepted an in-game offer and the conditions associated with the offer (S440). Referring to FIG. 5, for example, the players may accept an in-game mission and interact with a user interface to affirmatively confirm their acceptance of the offer and the terms of the offer, including the time the offer expires. For example, a player may accept or activate an offer to purchase item 1 from merchant A during period P.

Upon acceptance by the player, game platform 120 forwards the relevant offer information to the transaction processing entity 140, preferably through an application programing interface (API) established between the game platform 120 and the transaction processing entity 140 (S445). The offer information may be transmitted in one or more communication packets and include data identifying the player (e.g., a unique ID), the offer, and the merchant. The transaction processing entity 140 may process the information and respond to the game platform 120 to confirm that the offer information associated with the player is received and recognized (S450).

In accordance with one or more embodiments, if the player is enrolled with the transaction processing entity 140 (e.g., recognized based on the unique ID associated with the source of funds), then the offer is activated (S455, S460). Depending on implementation, the offer may be activated for a particular time period after which the offer expires (i.e., the offer is deactivated). If the transaction processing entity 140 does not recognize the player (e.g., if the player's unique ID is not recognized, or if the player's source of funds has insufficient funds, or if the credit card has expired), the activation of the offer fails and the game platform 120 is notified so appropriate measures can be taken to, for example, re-enroll the player (S465).

For an activated player offer and the reward to be processed, the game platform 120 may monitor information communicated to the game platform 120 from the transaction processing entity 140 about purchases made by enrolled players who have active offers. When an enrolled player makes a purchase using his enrolled credit card, for example, the transaction processing entity 140 recognizes the purchase as associated with the player's identification information maintained by the transaction processing entity 140 in a database 130.

Processing of an in-game transaction may be based on the activation information provided to the transaction processing entity 140 by the game platform 120. For example, when a player accepts an offer, an incentive may be activated and reported to the transaction processing entity 140 in association with a specific merchant. The transaction processing entity 140 then notifies the game platform 120, when the player purchases one or more goods or services from the specific merchant. In certain aspects, the player is identified as an eligible purchaser for that merchant, only during the time period the offer remains active.

If the above-noted requisite conditions are met, the transaction processing entity 140 reports, desirably through an API established between the transaction processing entity 140 and the game platform 120, that a purchase has been made by the player. The reported parameters may include the time and date of the purchase, the player's identification information, the amount of purchase and the merchant information. Upon receipt of the reported parameters, the game platform 120 may determine whether the purchase satisfies the conditions of the offer (e.g., whether the purchase was made during the active time period, for an acceptable amount, the particular goods/services, and from a valid merchant).

Accordingly, once the player's purchase is verified by the game platform 120, the player's reward is processed, unlocked and delivered. In certain implementations, if the game platform 120 determines that some of the parameters or conditions of the offer have not been met, the player may be notified and the reward will not be processed unless the player takes further action. For example, if the offer is no longer active, the player may be given an option to reactivate the offer, if still available, by accepting a new mission within the game environment.

In accordance with example embodiments, a transaction processing entity 140 (e.g., Visa) may be configured to read an identification data, such as stock keeping unit (SKU) level data, on merchandise purchased via a fund source (e.g., a Visa card). SKU data is digital information associated with merchandize and typically used by retailers to identify and track inventory. SKU level data may be forwarded to the game platform 120 and utilized to determine the total amount spent by a player on incentivized merchandize through the game, as well as to also collect data on each individual transaction. The ability to collect and analyze a higher level of transaction detail provides an opportunity to reward users on specific items they purchase by way of customizing the in-game offers towards merchandize and services that are more relevant to a player, based on the player profile being routinely updated using the collected SKU and transaction related data.

In certain embodiments, the game platform 120 may associate a unique identifier (i.e., a player ID) with a source of funds (e.g., credit card number) used by a player during an in-game purchase. In this manner, individual in-game purchases by the player may be identified and discreetly associated with the player. Based on such association, a player's purchases may be tracked and the player may be rewarded according to an incentive program or schedule based on frequent visits or total amount spent during a predetermined number of visits.

A player may be rewarded for making one or more purchases from one or more merchants in a certain time period (e.g., buy five burgers from Burger King® in the next 10 days and unlock XYZ feature or reward in the game). To accomplish this, the game platform 120 may track how many times a player made an eligible in-game purchase and tally the purchases to unlock a certain reward. In one example embodiment, a metaphoric or virtual punch card object may be associated with a particular player and specific merchant(s) such that a predetermined number of transactions between the player and the merchant(s) need to be identified before an in-game reward is provided to the player. For example, repeated purchases may need to occur within a time window in order for the player to qualify for an in-game reward.

In certain aspects, an online game may be configured to have a set of possible rewards with associated probabilities for each reward. That is, when a player makes a purchase at a given merchant, a random reward may be determined based on predefined statistics or probabilities. The player can then choose if the player can earn an additional reward based on the rewards they have already earned. For example, in one approach, the player may need to collect a predefined set or subset of the rewards to win a certain more desirable reward (e.g., hit a jackpot).

In certain implementations, the game platform 120 may be configured to host multiple games such that in different games the same (or different) incentives may be offered to a player. In one example, a player may be provided with the opportunity to opt-in for an incentive from a first merchant (e.g., Burger King) for a first game (e.g., Clash of Clans) during a predetermined period of time (e.g., 24 hours). During the identified incentive period, the incentive offered by the first merchant may not be offered (i.e., be visible) to the particular player in any other game. In this manner, the first merchant's offer is provided with a higher level of priority with respect to other merchants because the player opted for the first merchant's offer first. The commission arrangement may thus be shared specifically with the selected game, since the offer is unavailable in other games. After the predetermine time period for the opt-in expires, the same offer may re-appear for all games on the network for that player.

In certain embodiments, a game may be configured to include a rollover winning pool or lottery feature, so that instead of accepting a reward earned, the player can contribute the reward toward a lotto pool and receive a random lotto number. The more times the player contributes, the more lotto numbers he receives, and the higher the chances of matching a series of lotto numbers at the time of a drawing (e.g., daily, weekly, monthly). The winnings can be structured based on the number of matching lotto numbers (e.g., match 6 out of 6 and win the lotto; match 5 out of 6 and win a smaller sum, and so on). In this manner, the player is incentivized to contribute to the winning fund or pool. In certain aspects, one or more vendors may bid to sponsor each lottery drawing. The sponsoring vendors may also contribute to the pool for a bigger payout, thereby attracting a larger number of players to the game and resulting in increased vendor traffic.

Example Detailed Implementation Using Tokenized Funds

In one or more example implementations, when a player opens a location-based game, the player may be presented with a map. This map may have several elements such as loot crates or enemies with which the player can interact. Generally, these elements exist in the game and are not associated with real life structures and are simply anchored geospatially and superimposed on the map. The game environment may present to the player unique offers that are geo-spatially anchored to physical merchant locations. These offers will be displayed in game and the player can choose the offer-merchant combinations in which they are interested. The offer may indicate what digital goods the player will receive in exchange for making a purchase at the merchant and if there is a minimum purchase amount. If the player makes a purchase that satisfies the offer requirements, the player will receive a real-time notification indicating that their digital goods have been deposited into their account.

In order to determine if a player makes a purchase at a brick and mortar merchant, the following information may be required: fund source information, such as a credit card number or some hashed or tokenized form of it, a unique identifier for the merchant the player purchased from and a stream of all payment transactions at the merchant that were made using a fund source that may have been previously tokenized. The transaction processing entity platform provides access to this information in a secure and compliant manner. The transaction processing entity provides a fund source, such as a credit card, tokenization form that the game platform leverages for obtaining player fund source information securely. A merchant that accepts the transaction processing entity may be assigned a merchant ID, so the merchant can be informed of the transaction processing entity and from that point forward the transactions for that merchant that are made with tokenized funds will be remitted to the game platform.

When a transaction is made with tokenized funds, the transaction processing entity will communicate with the game platform in real-time and transmit the transaction details, e.g. tokenized funds, merchant, transaction amount. The game platform may use this information to locate the associated player and determine the active offer for the merchant and credit the players account for whatever digital goods that were advertised in the offer. The game platform may then send the player a push notification informing him of the credit. In some embodiments, an application programming interface (API) may be utilized by the game platform that facilitates spatial queries for nearby offers and supports webhooks for offer validation. A webhook refers to a callback (e.g., a transfer protocol push API) and is a way for an application to provide other applications with real-time information.

The merchant portal allows merchants to manage their subscription level, offers and anything related to their account. The hosted fund source tokenization form is a simple branded form that allows players to securely provide their fund source details to the transaction processing entity and for the game to obtain the tokenized fund source number. When a transaction is made with a tokenized fund source, the transaction processing entity may consume a webhook and provide transactions details. In one embodiment, card swipes and merchant items, merchant platform and the game platform interact to determine merchant and player identity and purchases.

Figure 6:
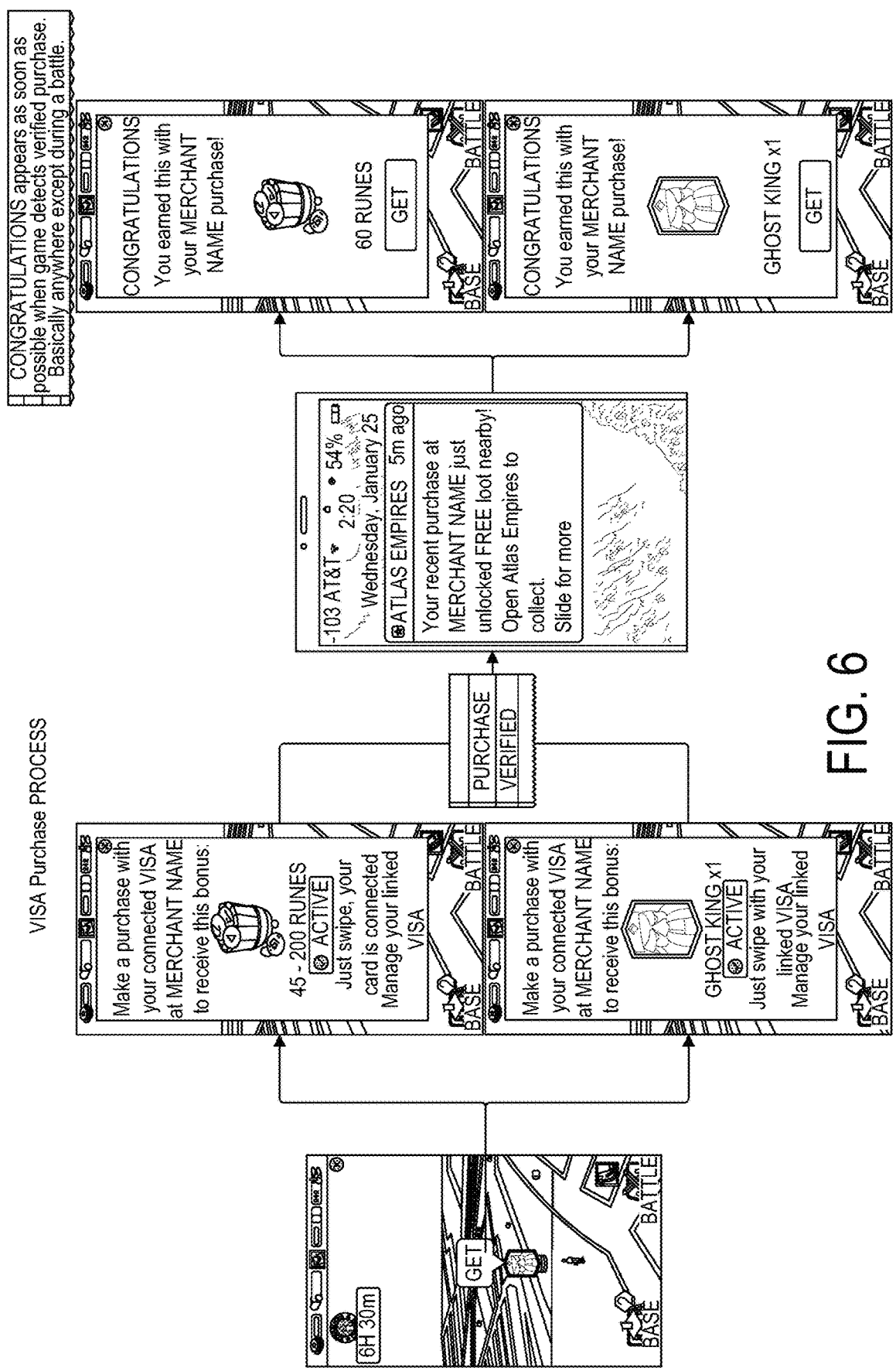
Figure 7:
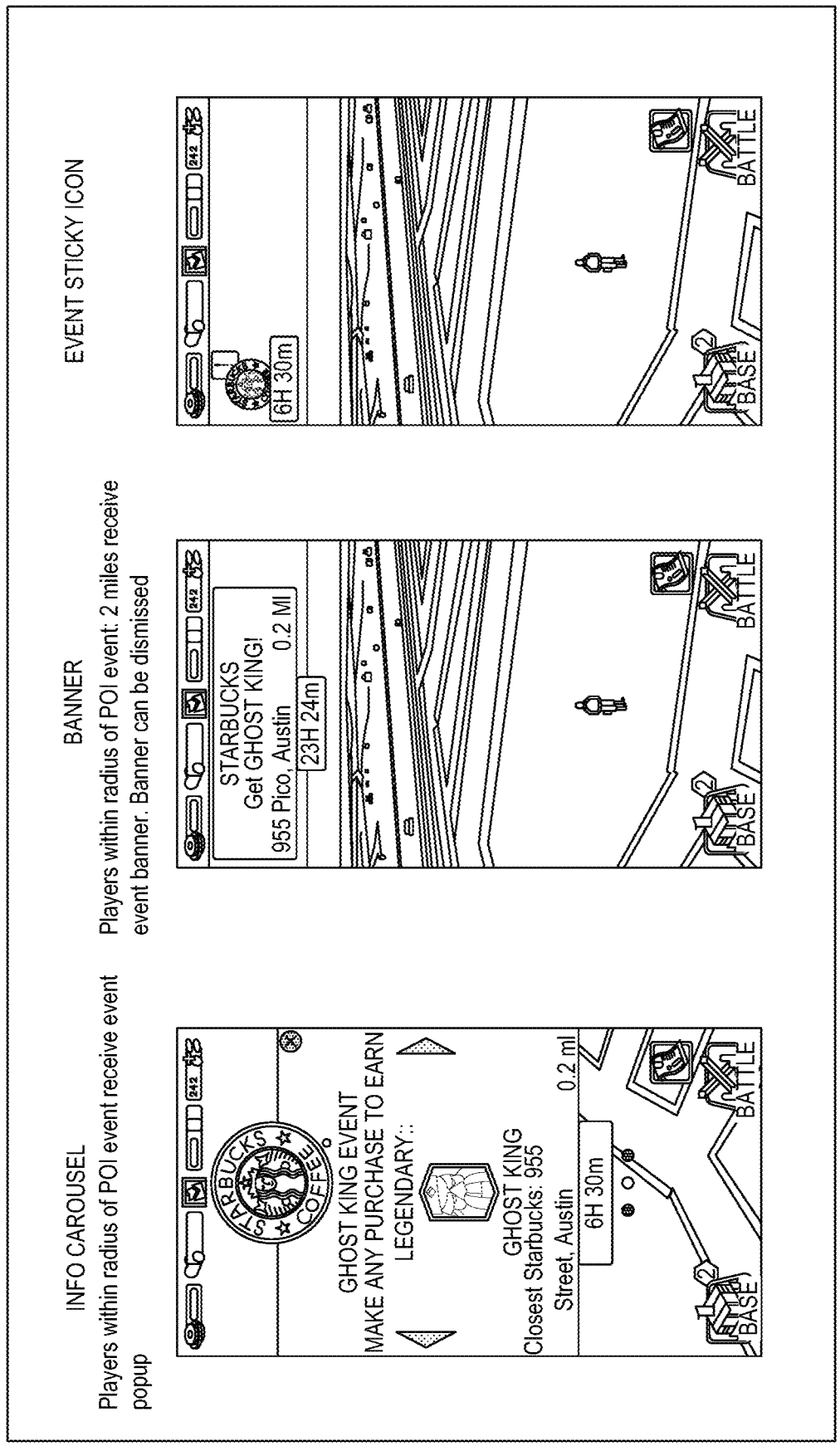

Referring to FIGS. 5, 6, and 7, the card swipes and merchant items allow players to connect a valid card, lock resources, and swipe for resources. Further, the card swipes and merchant items allow certain locations to host game items at their physical location, distribute game benefits to players, and notify the game in real time via the payment processor that a certain card made a purchase at an applicable merchant.

As shown in FIG. 5, players may connect or authenticate their credit card number one time per game, for example. Once a card is connected, rewards will trigger automatically upon purchase.

As shown in FIG. 6, the game platform may read the players location and surface opportunities to collect from merchants in a radius around the geo-location of a player. Once a player sees a reward in the game, the player can make a purchase to collect in-game rewards from the location in real time.

As shown in FIG. 7, a world space corresponding to the real world with additional overlays on top of the real world may be provided to a player or a user. As the player navigates the game environment, the system compares current position to a reward database. Processes may run in the background to determine one or more new rewards from a reward tier. A player may be notified of a merchant offer based on offer information made available to the game platform. A reservation object may be created in a database when the user locks the offer which calls the transaction processing entity to activate an offer API and ties the user to a reward ID. When the user purchases the merchant offer, the offer is matched to the user reservation by purchase timestamp and merchant ID.

Once the offer is identified in transactions, a database entry is created confirming the transaction. This database entry may have the following data fields: amount, timestamp, transaction processing entity transaction id, transaction processing entity merchant ID, game platform merchant ID, game platform commission amount, transaction processing entity fee for transaction, transaction processing entity fund source id, transaction processing entity offer ID, user id, and user fund source id. Push notification or email may be sent to user from a webhook in real time as the transaction is processed. The computing system on which the game is executed, then displays notification or email received.

The redemption process of the merchant offer is such that when the user selects the offer, an activate offer request is sent to the transaction processing entity's system which ties the user's fund to the transaction processing entity fund linked offer. When the player physically swipes, scans, inserts, taps or the like, their fund source at the merchant, as they are attached to the transaction processing entity fund linked offer, the transaction processing entity will then send a packet with relevant transaction info to the webhook. The webhook function determines reward for user, sends the user a notification, and stores the purchase info in a database.

Figure 8:
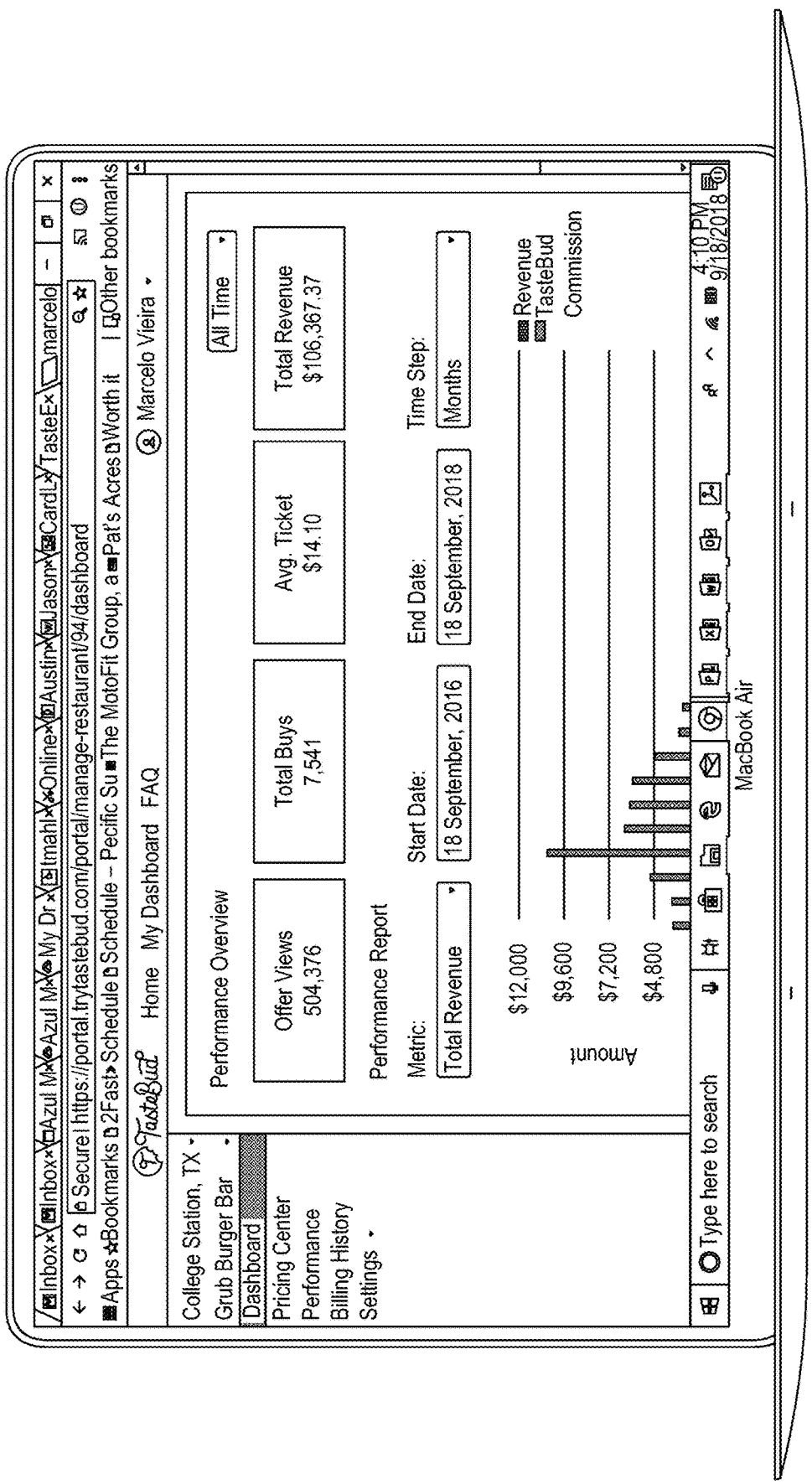
Figure 9:
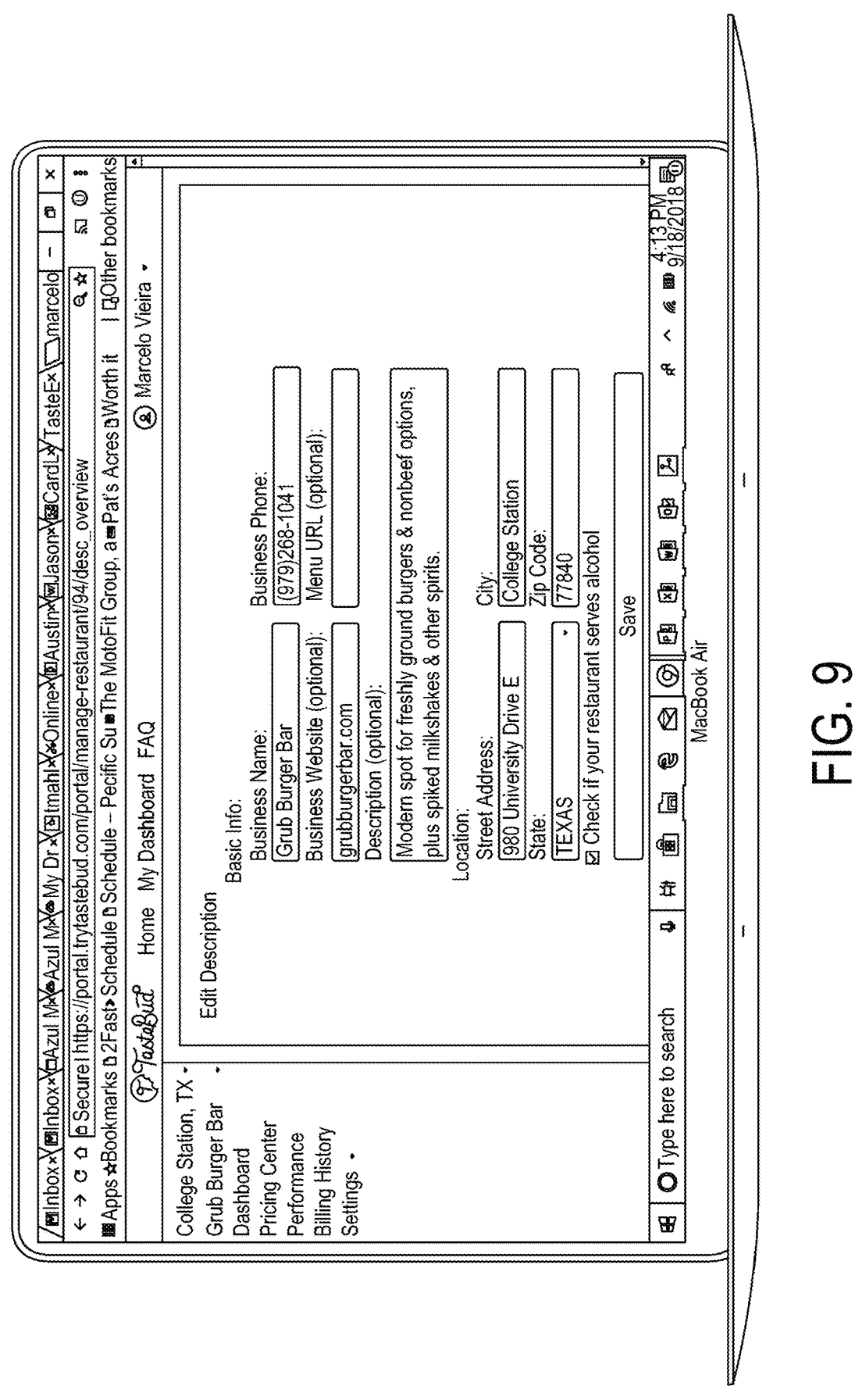

Referring to FIGS. 8 and 9, the merchant platform allows merchants to sign up via web portal, select a reward tier level for in game use, indicate valid locations to be used in game, access the merchant analytics platform, and pay fees such as a monthly fee or fee per attributed swipe or purchase. The game platform may allow game studios to use a software development kit (SDK) to integrate the game platform system into their game properties, set custom game rewards based on reward tier level and keep a percentage of revenue that the merchant pay per swipe or purchase.

As shown in FIGS. 8 and 9, merchants can see how often games on the game platform showed the merchant offer to players, how many players ended up swiping, locking or buying, and the average ticket price and total revenue. Merchants can add their business or other locations to the platform. Merchants can set a spend limit on each campaign per location. In some embodiments, the merchants on the game platform may not select the outcome of a user making a purchase at their location. Merchants may subscribe to a tiered level of the reward tier model. The video game studios decide what items to give away in their game according to what items are in each tier.

It is noteworthy that the details and embodiments disclosed herein are provided by way of example and should not be construed as limiting the scope of the disclosed subject matter to the particular details or specific embodiments. Certain implementations may provide or apply the disclosed concepts and processes, with some variations, to any game, game platform, or game device, whether location-based or not. For example, a player may use an identification mechanism (e.g., a credit card) to register with one or more merchants or game platforms. In-game offers may be presented to the player to incentivize the player to visit or shop at one or more merchant location. If the player uses the registered card within defined parameters (e.g., to purchase certain items, at certain minimum prices, at certain locations, within a certain time period), then the player will receive a reward in the game, once the parameters have been met.

Figure 10:
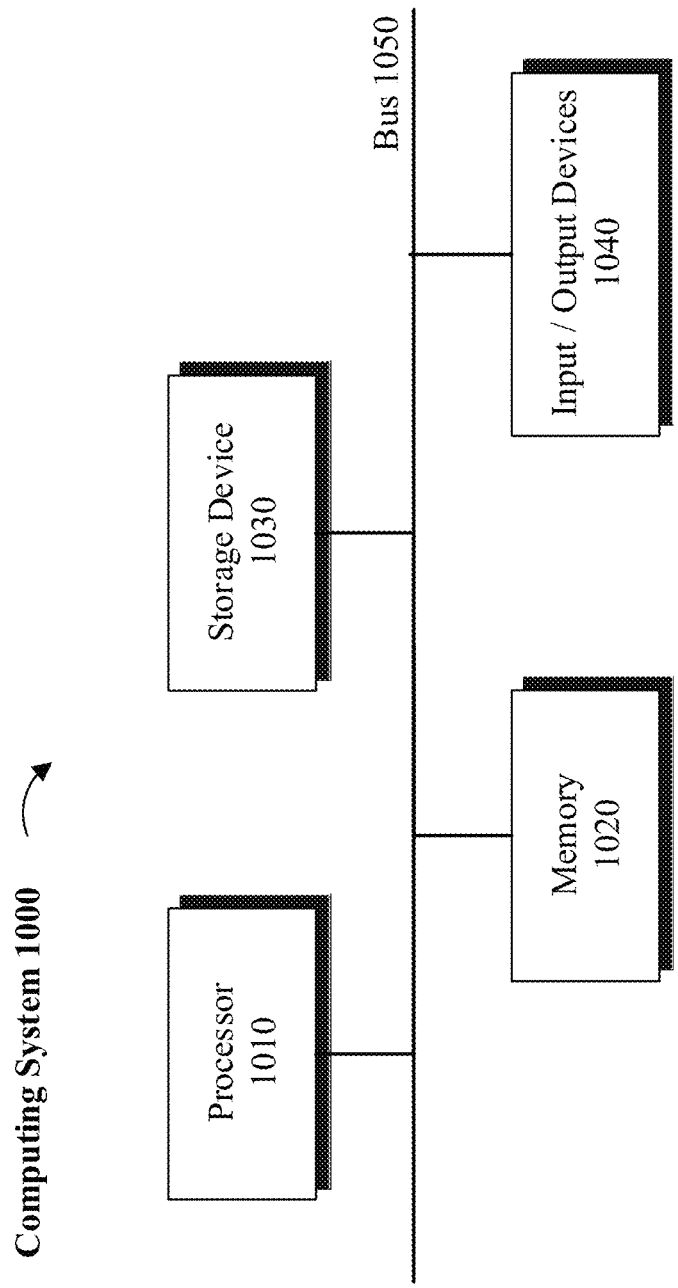
FIG. 10 is a block diagram of an example computing system that may be utilized to perform one or more computing operations or processes as consistent with one or more disclosed features.

Referring to FIG. 10, a block diagram illustrating a computing system 1000 consistent with one or more embodiments is provided. The computing system 1000 may be used to implement or support one or more platforms, infrastructures or computing devices or computing components that may be utilized, in example embodiments, to instantiate, implement, execute or embody the methodologies disclosed herein in a computing environment using, for example, one or more processors or controllers, as provided below.

As shown in FIG. 10, the computing system 1000 can include a processor 1010, a memory 1020, a storage device 1030, and input/output devices 1040. The processor 1010, the memory 1020, the storage device 1030, and the input/output devices 1040 can be interconnected via a system bus 1050. The processor 1010 is capable of processing instructions for execution within the computing system 1000. Such executed instructions can implement one or more components of, for example, a cloud platform. In some implementations of the current subject matter, the processor 1010 can be a single-threaded processor. Alternately, the processor 1010 can be a multi-threaded processor. The processor 1010 is capable of processing instructions stored in the memory 1020 and/or on the storage device 1030 to display graphical information for a user interface provided via the input/output device 1040.

The memory 1020 is a computer readable medium such as volatile or non-volatile that stores information within the computing system 1000. The memory 1020 can store data structures representing configuration object databases, for example. The storage device 1030 is capable of providing persistent storage for the computing system 1000. The storage device 1030 can be a floppy disk device, a hard disk device, an optical disk device, or a tape device, or other suitable persistent storage means. The input/output device 1040 provides input/output operations for the computing system 1000. In some implementations of the current subject matter, the input/output device 1040 includes a keyboard and/or pointing device. In various implementations, the input/output device 1040 includes a display unit for displaying graphical user interfaces.

According to some implementations of the current subject matter, the input/output device 1040 can provide input/output operations for a network device. For example, the input/output device 1040 can include Ethernet ports or other networking ports to communicate with one or more wired and/or wireless networks (e.g., a local area network (LAN), a wide area network (WAN), the Internet).

In some implementations of the current subject matter, the computing system 1000 can be used to execute various interactive computer software applications that can be used for organization, analysis and/or storage of data in various (e.g., tabular) format (e.g., Microsoft Excel®, and/or any other type of software). Alternatively, the computing system 1000 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities or can be standalone computing products and/or functionalities. Upon activation within the applications, the functionalities can be used to generate the user interface provided via the input/output device 1040. The user interface can be generated and presented to a user by the computing system 1000 (e.g., on a computer screen monitor, etc.).

One or more aspects or features of the subject matter disclosed or claimed herein may be realized in digital electronic circuitry, integrated circuitry, specially designed application specific integrated circuits (ASICs), field programmable gate arrays (FPGAs) computer hardware, firmware, software, and/or combinations thereof. These various aspects or features may include implementation in one or more computer programs that may be executable and/or interpretable on a programmable system including at least one programmable processor, which may be special or general purpose, coupled to receive data and instructions from, and to transmit data and instructions to, a storage system, at least one input device, and at least one output device. The programmable system or computing system may include clients and servers. A client and server may be remote from each other and may interact through a communication network. The relationship of client and server arises by virtue of computer programs running on the respective computers and having a client-server relationship to each other.

These computer programs, which may also be referred to as programs, software, software applications, applications, components, or code, may include machine instructions for a programmable controller, processor, microprocessor or other computing or computerized architecture, and may be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium may store such machine instructions non-transitorily, such as for example as would a non-transient solid-state memory or a magnetic hard drive or any equivalent storage medium. The machine-readable medium may alternatively or additionally store such machine instructions in a transient manner, such as for example as would a processor cache or other random access memory associated with one or more physical processor cores.

To provide for interaction with a user, one or more aspects or features of the subject matter described herein may be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices may be used to provide for interaction with a user as well. For example, feedback provided to the user may be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive trackpads, voice recognition hardware and software, optical scanners, optical pointers, digital image capture devices and associated interpretation software, and the like.

Terminology

When a feature or element is herein referred to as being "on" another feature or element, it may be directly on the other feature or element or intervening features and/or elements may also be present. In contrast, when a feature or element is referred to as being "directly on" another feature or element, there may be no intervening features or elements present. It will also be understood that, when a feature or element is referred to as being "connected", "attached" or "coupled" to another feature or element, it may be directly connected, attached or coupled to the other feature or element or intervening features or elements may be present.

In contrast, when a feature or element is referred to as being "directly connected", "directly attached" or "directly coupled" to another feature or element, there may be no intervening features or elements present.

Although described or shown with respect to one embodiment, the features and elements so described or shown may apply to other embodiments. It will also be appreciated by those of skill in the art that references to a structure or feature that is disposed "adjacent" another feature may have portions that overlap or underlie the adjacent feature.

Terminology used herein is for the purpose of describing particular embodiments and implementations only and is not intended to be limiting. For example, as used herein, the singular forms "a", "an" and "the" may be intended to include the plural forms as well, unless the context clearly indicates otherwise. It will be further understood that the terms "comprises" and/or "comprising," when used in this specification, specify the presence of stated features, steps, operations, processes, functions, elements, and/or components, but do not preclude the presence or addition of one or more other features, steps, operations, processes, functions, elements, components, and/or groups thereof. As used herein, the term "and/or" includes any and all combinations of one or more of the associated listed items and may be abbreviated as "/".

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

Spatially relative terms, such as "forward", "rearward", "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features due to the inverted state. Thus, the term "under" may encompass both an orientation of over and under, depending on the point of reference or orientation. The device may be otherwise oriented (rotated 90 degrees or at other orientations) and the spatially relative descriptors used herein interpreted accordingly. Similarly, the terms "upwardly", "downwardly", "vertical", "horizontal" and the like may be used herein for the purpose of explanation only unless specifically indicated otherwise.

Although the terms "first" and "second" may be used herein to describe various features/elements (including steps or processes), these features/elements should not be limited by these terms as an indication of the order of the features/elements or whether one is primary or more important than the other, unless the context indicates otherwise. These terms may be used to distinguish one feature/element from another feature/element. Thus, a first feature/element discussed could be termed a second feature/element, and similarly, a second feature/element discussed below could be termed a first feature/element without departing from the teachings provided herein.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical values given herein should also be understood to include about or approximately that value, unless the context indicates otherwise.

For example, if the value "10" is disclosed, then "about 10" is also disclosed. Any numerical range recited herein is intended to include all sub-ranges subsumed therein. It is also understood that when a value is disclosed that "less than or equal to" the value, "greater than or equal to the value" and possible ranges between values are also disclosed, as appropriately understood by the skilled artisan. For example, if the value "X" is disclosed the "less than or equal to X" as well as "greater than or equal to X" (e.g., where X is a numerical value) is also disclosed. It is also understood that the throughout the application, data is provided in a number of different formats, and that this data, may represent endpoints or starting points, and ranges for any combination of the data points. For example, if a particular data point "10" and a particular data point "15" may be disclosed, it is understood that greater than, greater than or equal to, less than, less than or equal to, and equal to 10 and 15 may be considered disclosed as well as between 10 and 15. It is also understood that each unit between two particular units may be also disclosed. For example, if 10 and 15 may be disclosed, then 11, 12, 13, and 14 may be also disclosed.

Although various illustrative embodiments have been disclosed, any of a number of changes may be made to various embodiments without departing from the teachings herein. For example, the order in which various described method steps are performed may be changed or reconfigured in different or alternative embodiments, and in other embodiments one or more method steps may be skipped altogether. Optional or desirable features of various device and system embodiments may be included in some embodiments and not in others. Therefore, the foregoing description is provided primarily for the purpose of example and should not be interpreted to limit the scope of the claims and specific embodiments or particular details or features disclosed.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal.

The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

The examples and illustrations included herein show, by way of illustration and not of limitation, specific embodiments in which the disclosed subject matter may be practiced. As mentioned, other embodiments may be utilized and derived therefrom, such that structural and logical substitutions and changes may be made without departing from the scope of this disclosure. Such embodiments of the disclosed subject matter may be referred to herein individually or collectively by the term "invention" merely for convenience and without intending to voluntarily limit the scope of this application to any single invention or inventive concept, if more than one is, in fact, disclosed. Thus, although specific embodiments have been illustrated and described herein, any arrangement calculated to achieve an intended, practical or disclosed purpose, whether explicitly stated or implied, may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The disclosed subject matter has been provided here with reference to one or more features or embodiments. Those skilled in the art will recognize and appreciate that, despite of the detailed nature of the example embodiments provided here, changes and modifications may be applied to said embodiments without limiting or departing from the generally intended scope. These and various other adaptations and combinations of the embodiments provided here are within the scope of the disclosed subject matter as defined by the disclosed elements and features and their full set of equivalents.

A portion of the disclosure of this patent document may contain material, which is subject to copyright protection. The owner has no objection to facsimile reproduction by any one of the patent documents or the patent disclosure, as it appears in the Patent and Trademark Office patent files or records, but reserves all copyrights whatsoever. Certain marks referenced herein may be common law or registered trademarks of the applicant, the assignee or third parties affiliated or unaffiliated with the applicant or the assignee. Use of these marks is for providing an enabling disclosure by way of example and shall not be construed to exclusively limit the scope of the disclosed subject matter to material associated with such marks.

What is claimed is:

1. A computer-implemented system comprising one or more processors in communication with storage media for storing location data, the one or more processors being configured to:
   host a location-based virtual environment in which one or more users participate;
   determine geographic coordinates of a user based on data provided by a positioning system in communication with a user device associated with the user;
   map the geographic coordinates of the user to virtualized coordinates of an avatar in the virtual environment,
      the avatar being associated with the user, and
      the virtualized coordinates of the avatar in the virtual environment corresponding to the user's geographic coordinates;
   responsive to physical location of the user device changing from a first position to a second position in the real world, update the geographic coordinates of the user and the virtualized coordinates of the avatar to reflect the change from the first position to the second position both in the real world and in the virtual environment, respectively;
   compare the geographic coordinates of the user to real world geographic coordinates of one or more entities having a virtual presence in the virtual environment, the one or more entities being present in the virtual environment to promote goods or services by way of one or more offers presented in the virtual environment, the comparing generating a first result,
      the first result includes at least an approximate location of the user with respect to a first entity, the system further comprising a graphical user interface for generating a map that displays locations of the one or more entities;
   providing a list of rewards associated with at least one of the offers based on the first result, the user accepting one or more options to activate at least a first reward from the list of rewards, the first reward being associated with purchasing goods and services from the first entity; and
   responsive to the user selecting the first reward, activate the first reward for a first time period in association with one or more of the goods or services offered by the first entity,
   wherein the user is offered to apply for a new source of funds, if the user is not awarded the first reward in response to at least one of:

failing to verify that the user purchased the offered goods or services associated with the first reward during the first time period, failing to verify the user purchase, due to insufficient funds in the source of funds, or failing to verify the user purchase, due to an invalid source of funds.

2. The system of claim 1, wherein payment transaction data is received from a transaction processing entity, in response to the user purchasing at least one of the one or more goods or services offered by the first entity.

3. The system of claim 2, wherein the payment transaction data comprises at least one of a timestamp and an identifier, the timestamp indicating a time of purchase and the identifier identifying the first entity or an offer by the first entity that was activated by the user.

4. The system of claim 3, wherein the user is awarded the first reward, in response to verifying the user has purchased the offered goods or services associated with the first reward during the first time period based on the payment transaction data.

5. The system of claim 2, wherein the payment transaction data comprises the user identifier.

6. The system of claim 1, wherein the user is associated with a source of funds.

7. The system of claim 6, wherein the source of funds is associated with a user identifier identifying the user when the user purchases at least one of the one or more goods or services using the source of funds.

8. The system of claim 1, wherein the virtual environment is a location-based reality game.

9. The system of claim 1, wherein information about the entities' coordinates or goods or services offered by the entities or the associated rewards are stored in a database accessible by the one or more processors.

10. A computer-implemented method comprising:
hosting a location-based virtual environment in which one or more users participate;
determining geographic coordinates of a user in real world using data provided by a positioning system;
comparing the user's real world geographic coordinates to real world geographic coordinates of one or more entities having a presence in the virtual environment to generate a first result, the one or more entities being present in the virtual environment to promote goods or services by way of one or more offers presented in the virtual environment;
accessing a list of rewards associated with at least one of the offers based on the first result,
the first result includes at least an approximate location of the user with respect to a first entity as shown on a map generated on a graphical user interface that displays locations of the one or more entities;
presenting to the user options for accepting or activating at least a first reward from the list of rewards, the first reward being associated with purchasing goods and services from the first entity, in response to determining the user is associated with a source of funds;
responsive to the user selecting the first reward, activating the first reward for a first time period in association with one or more of the goods or services offered by the first entity;
receiving payment transaction data from a transaction processing entity, in response to the user purchasing at least one of the one or more goods or services offered by the first entity, the payment transaction data comprising at least one of a timestamp and an identifier, the timestamp indicating a time of purchase and the identifier identifying the first entity or an offer by the first entity that was activated by the user; and
notifying the user that the user has been awarded the first reward, in response to verifying the user has purchased the offered goods or services associated with the first reward during the first time period based on the payment transaction data,
wherein the user is offered to apply for a new source of funds, if the user is not awarded the first reward in response to at least one of:
failing to verify that the user purchased the offered goods or services associated with the first reward during the first time period,
failing to verify the user purchase, due to insufficient funds in the source of funds, or failing to verify the user purchase, due to an invalid source of funds.

11. The method of claim 10, wherein the virtual environment is a location-based reality game.

12. The method of claim 11, wherein the source of funds is associated with a user identifier identifying the user when the user purchases at least one of the one or more goods or services using the source of funds.

13. The method of claim 12, wherein the transaction data comprises the user identifier.

14. The method of claim 13, wherein the user is not awarded the first reward, in response to failing to verify that the user purchased the offered goods or services associated with the first reward during the first time period.

15. The method of claim 10, wherein information about the entities' real world coordinates or goods or services offered by the entities or the associated rewards is stored in a database accessible by the one or more processors.

16. The method of claim 10, wherein the user is unable to accept or activate the first reward, in response to failing to verify that the user is associated with a source of funds.

17. The method of claim 16, wherein the user is offered to apply for a new source of funds or enter information about a pre-established source of funds.

18. The method of claim 17, wherein in response to being approved for the new source of funds or verification of the pre-established source of funds, a unique identifier is associated with the user.

19. The method of claim 18, wherein the unique identifier is included in the payment transaction data to verify the user has purchased the offered goods or services associated with the first reward during the first time period based on the payment transaction data.

* * * * *